Feb. 9, 1926.
H. PERLESZ
1,571,964
MOUNTING FOR THERMIONIC VALVES
Filed July 23, 1924
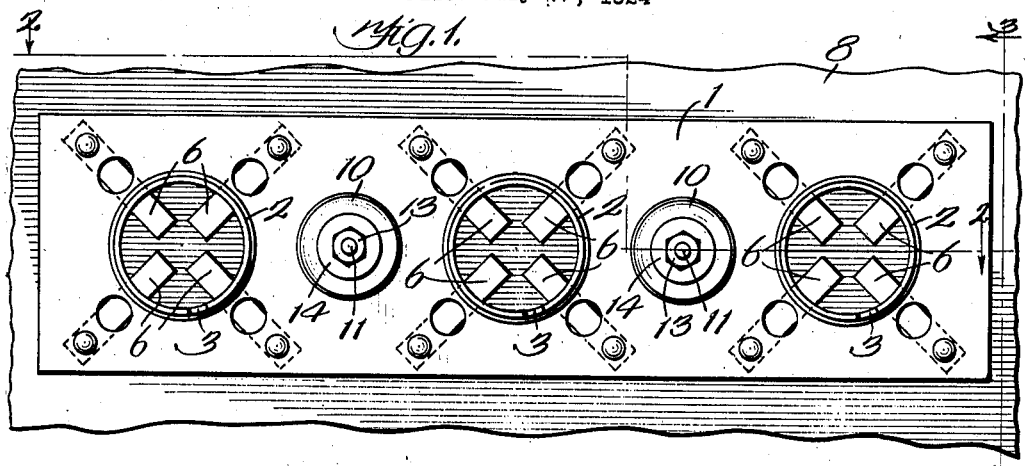
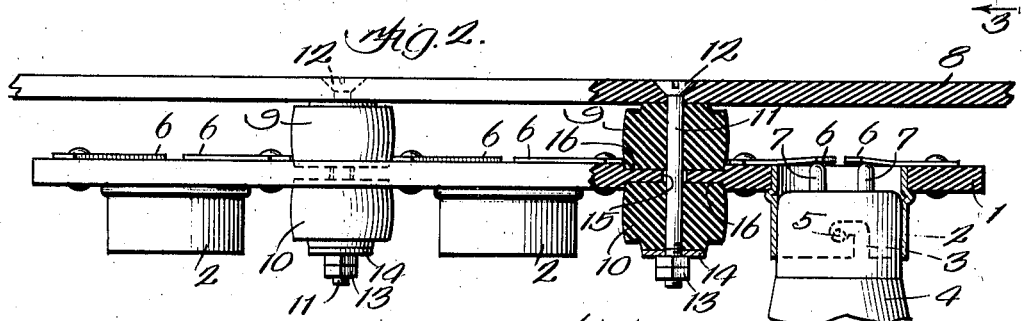
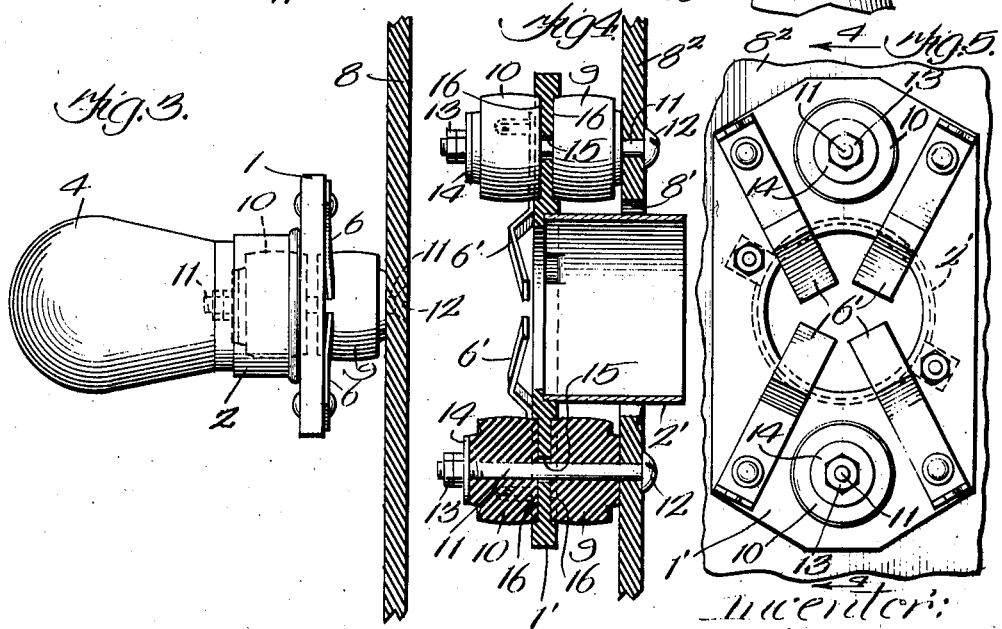
Inventor:
Hugo Perlesz Patented Feb. 9, 1926.

1,571,964

UNITED STATES PATENT OFFICE.

HUGO PERLESZ, OF CHICAGO, ILLINOIS, ASSIGNOR, BY MESNE ASSIGNMENTS, TO ZENITH RADIO CORPORATION, A CORPORATION OF ILLINOIS.

MOUNTING FOR THERMIONIC VALVES.

Application filed July 23, 1924. Serial No. 727,686.

*To all whom it may concern:*

Be it known that I, HUGO PERLESZ, a citizen of the United States, residing at Chicago, in the county of Cook and the State of Illinois, have invented a certain new and useful Improvement in Mountings for Thermionic Valves, of which the following is a full, clear, concise, and exact description.

My invention relates to thermionic valve mountings that are provided for the purpose of absorbing vibrations to guard against the disturbance of the relation of the valve elements by the knocks and shocks to which such valves are commonly subject, my invention being especially useful in conjunction with thermionic valves employed in systems of radio communication.

One of the devices hitherto devised for the purpose stated comprised a plurality of yielding members, in the form of blocks of sponge rubber, serially interposed between the valve and the ultimate rigid supporting structure, such as a cabinet wall, the planes of free movements of these members being at right angles to each other. Another prior device included a single horizontal rectangular block of sponge rubber fastened at its four corners and carrying the valve at the intersection of its diagonals. Still another device included two parallel thick rubber strips each fastened at each of its ends to an underlying rigid support and having the valve assembled therewith between its ends.

The prior mountings only partially performed their function as they all included plinths or strips of rubber of such size or extent and so assembled with their rigid supports as to constitute comparatively broad bases. Such a base, while tending to absorb the external vibrations, also opposed material movements of the valve relative to its shock absorbing mounting, portions of this mounting being not only thus obstructive, but actually tending to transmit some of the very vibrations to the valve that are intended to be absorbed.

The shock absorbing mounting of my invention is so limited in extent and is so disposed as not only to permit universal movement of the valve with respect to the cabinet or other ultimate rigid support that indirectly carries the valve, but also preferably permits sufficient movements of the valve with respect to the shock absorbing mounting itself and of the shock absorbing mounting with respect to either or both the rigid support and valve base to overcome the objections stated.

The invention will be more fully explained in connection with the accompanying drawing in which Fig. 1 is an elevation illustrating the preferred embodiment of the invention; Fig. 2 is a side view, with a portion in section, of the structure shown in Fig.1; Fig. 3 is a view on line 3—3 of Fig. 1; Fig. 4 is a sectional view of another embodiment taken on line 4—4 of Fig. 5; and Fig. 5 is a face view of the structure shown in Fig. 4.

The structure illustrated in Figs. 1, 2 and 3 includes a valve base 1 in the form of a narrow plate of insulating material, a row of sockets 2 that are preferably metallic and have bayonet slots 3 formed therethrough, thermionic valve bulbs 4 whose bases are received in said sockets and carry pins 5 received in said bayonet slots, and contact springs 6 mounted upon the valve base 1 and having their free ends in register with the bores of the sockets to be engaged by the terminal pins 7 of the elements within the bulbs when the pins upon the bulbs are fully seated in the bayonet slots. Still referring to the structure shown in Figs. 1, 2 and 3, the valve base 1 is mounted upon a rigid support 8, such as the panel or wall of a cabinet, through the intermediation of aligned resilient cushioning bodies 9, 10 arranged upon opposite sides of the base 1 and held in assembly with said base and the rigid support by means of bolts 11, one bolt to each pair of cushioning bodies. These bolts are shown with their heads 12 seated against the rigid support 8, and with their stems passing through and coaxial with the aligned resilient bodies 9, 10 that are preferably made of very yielding or soft and highly resilient rubber. The nuts 13 are screwed upon the outer ends of the bolts and against the insulating washers 14 that press upon the bodies 10. The holes 15 in the valve base 1 are slightly larger than the bolts to permit the valve base 1 and the thermionic valves thereon to move universally to a limited extent with respect to the bolts. The axes of the bolts, sockets and the cushioning bodies are desirably substantially in one plane that is perpendicular to the rigid support 8. To hold the base 1 out of contact with the bolts, said bolts are snugly received by the cushions and the adjacent ends of the cushions are snugly received in circular recessed seats 16 formed in opposite sides of the mounting plates around each hole 15 and whose rims snugly engage the circular cushions 9, 10. By having the side walls of the recesses 16 endless it will be apparent that movement of the mounting plate 1 in any direction relative to the support 8 will exert a direct compressive force on one or both cushions 9 and 10 and thereby enhance the shock absorbing characteristics of the structure over those structures in which no direct compressive force is exerted on the cushions when the mounting plate is moved in certain directions relative to its support.

The structure shown in Figs. 4 and 5 is generally similar to that shown in the other figures, like parts being given similar characters of reference. But one bulb receiving socket 2¹ is shown in Figs. 4 and 5, this socket extending through the larger hole 8¹ formed in the rigid support 8². The contact springs 6¹ are located similarly to the contact springs 6 in the structure of Figs. 1, 2, 3.

Changes may be made without departing from my invention.

Having thus described my invention, I claim:—

The combination with a mounting plate; of a support for said plate; bolts carried by said support and passing through holes formed in the mounting plate substantially midway between the sides of the plates, these holes being larger than said bolts and affording clearance between said bolts and mounting plate, said mounting plate also being formed with recessed seats on both sides thereof at and around each of said holes, the side walls of each of said recesses being endless; cushions disposed between said support and the adjacent side of said mounting plate and snugly received in the seats upon this side of said mounting plate; and other cushions snugly received in the seats upon the other side of said mounting plate and aligned respectively with the cushions upon the first side of the mounting plate, said bolts passing snugly through the aligned cushions and clamping the same and the mounting plate therebetween in assembly with said support, said cushions positioning said bolts clear of the mounting plate, whereby a direct compressive force will be exerted on at least one of the cushions upon movement of the mounting plate in any direction relative to the support.

In witness whereof, I hereunto subscribe my name.

HUGO PERLESZ.